3,547,623
METHOD OF RECOVERING IRON OXIDE FROM FUME CONTAINING ZINC AND/OR LEAD AND SULFUR AND IRON OXIDE PARTICLES
Bernard J. Larpenteur, Cornwall, and Joseph W. Pasquali, Allentown, Pa., assignors to Bethlehem Steel Corporation, a corporation of Delaware
No Drawing. Filed Mar. 6, 1967, Ser. No. 620,652
Int. Cl. C21b 1/08; C22b 7/02
U.S. Cl. 75—25                            2 Claims

ABSTRACT OF THE DISCLOSURE

A method of recovering iron oxide particles from fume contaminated with zinc oxide and/or lead oxide and sulfur, by mixing a flux comprising lime and magnesia with the fume and burning the mix in the presence of carbonaceous material, the zinc oxide and/or lead oxide being reduced by carbon and reforming zinc oxide and/or lead oxide particles which pass out of the furnace with the waste gases. The sulfur in the fume and in the carbonaceous material combines with excess oxygen to form $SO_2$ and passes out of the furnace with the waste gases. The agglomerates of iron oxide and flux formed in the process have a lime to magnesia ratio of about 2.5 to 1 to about 15 to 1 and may vary in size.

BACKGROUND OF THE INVENTION

The invention relates to a pyrometallurgical process for reclaiming metallic values such as iron oxide from the fume produced in oxygen refining processes and the agglomerates produced thereby.

Fume from basic oxygen furnaces and basic oxygen open hearth furnaces contains very fine particles of iron oxide formed during the oxygen injection of steel during refining. The particles are so fine they cannot be used as charge materials in iron or steel refining furnaces. They are also contaminated with zinc oxide, and/or lead oxide and sulfur. Because of the fine particle size and the contaminants present it has been the usual practice to store these fumes or mix them with iron ore fines to prepare a mix which may be sintered on a traveling rate prior to use in the blast furnace.

SUMMARY

Broadly, the invention includes forming a charge mix of basic oxygen furnace fume and/or basic oxygen open hearth furnace fume and a flux comprising lime and magnesia, adding thereto a carbonaceous material and charging the mix into a horizontally inclined rotating furnace and therein removing the contaminants from the fume and agglomerating the mix.

It is therefore the object of this invention to provide a process whereby the iron oxide in said fume will be formed into suitable charge material for refining furnaces and which will eliminate the contaminants therein.

DESCRIPTION OF THE PREFERRED EMBODIMENTS

In a more detailed description of the invention, basic oxygen furnace fume and/or basic oxygen open hearth furnace fume recovered in the waste dust recovery systems of such furnaces is mixed in conventional equipment such as pug mill, with a lime and magnesia bearing flux. The lime may be from the group comprising calcined lime, dolomitic lime, dolomite, limestone, carbide-lime sludge, waste limestone tailings and kiln dust from lime burning plants. The magnesia may be from the group comprising fine dolomitic lime and dolomite.

The mixture, which may be from 10% fume to 50% fume and the balance flux material having lime and magnesia therein, is then charged into one end of an inclined rotary kiln having a charging end and a discharging end. A carbonaceous material, for example, coal, coke or coke breeze is charged with the fume and the flux. The amount of carbonaceous material charged should be about 8% to about 20% by weight of the total charge of fume and flux. The heat required for the subsequent operations is provided by combustion of any suitable fuel such as fuel oil or natural gas introduced into the kiln at the discharge end of the kiln. Excess air, that is, air that is not required for the combustion of the fuel is added to the kiln at the discharge end thereof. As the kiln rotates, the charged mix proceeds downwardly from the charge end of the kiln to the discharge end, countercurrent to the flow of the gases of combustion which provide heat and elements for subseqeunt reactions.

Because sulfur, zinc oxide and lead oxide are objectionable impurities in raw materials which are charged into iron and steel refining furnaces, they must be removed from the raw materials. As the fume from the BOF or BOOH are contaminated with these impurities, it is necessary to remove a major portion of the sulfur, that is, reduce the sulfur content to a value which may be tolerated in steelmaking furnaces, and to remove substantially all of the zinc oxide and/or lead oxide.

Zinc oxide and/or lead oxide may be reduced to metallic zinc and/or lead by the reaction with carbonaceous materials at the temperatures prevalent in the charging end of the kiln which may be as low as 1800° F. As the charged materials pass downwardly in the kiln, the fume comes into contact with the carbonaceous particles and the zinc oxide and/or lead oxide are reduced to metallic zinc and/or lead respectively which pass into the kiln atmosphere in vapor form. The metallic zinc and/or lead combine with oxygen present in the kiln atmosphere either as free oxygen or as carbon dioxide, reacting therewith to form zinc oxide and/or lead oxide which pass out of the kiln as fine particles of dust in the waste gas products of combustion. As it is not desired to reduce iron oxide to metallic iron by the action of carbonaceous materials in this process, only a sufficient amount of carbonaceous material should be added to provide reducing conditions for the zinc oxide and/or lead oxide in the bed of charged materials, thereby keeping the reduction of the iron oxide particles to ion at a minimum.

The sulfur in the fume and in the charged carbonaceous material is oxidized by the excess oxygen introduced into the kiln as excess air with the gaseous products of combustion in the kiln atmosphere at or near the discharge end of the kiln which is at about 2200° F. to 2700° F., and forms $SO_2$ gas which passes off with the waste gases. It has been found that a slightly reducing atmosphere may be tolerated in the kiln but it is preferred to add up to about 20% excess air to the kiln to oxidize the sulfur. A portion of the excess air combines with a portion of the carbonaceous material in the charge.

It has also been found that, within limits, the finer the carbonaceous material the more efficient is the reaction with zinc oxide and/or lead oxide. However, if the carbonaceous material is too fine it will blow out of the kiln or burn out prematurely. We have found that a carbonaceous material having a particle size which will pass a 10 mesh Tyler sieve size but will be retained on a 200 mesh Tyler sieve size may be used although we prefer to use a particle size which will pass a 10 Tyler sieve size but will be retained on a 100 mesh Tyler sieve size.

The kiln may be fired to a temperature of between 2200° F. and 2700° F. to agglomerate the charged materials although we prefer to fire the kiln to a temperature range of 2550° F. to 2650° F. As the mix passes through the kiln, the materials in the mix will agglomerate to form hard, dense, uneven, nonuniformly sized particles suitable for charging into a metallurgical furnace. The agglomerates formed in the process generally contain a flux and iron oxide and some dicalcium ferrites, although some compositions may produce agglomerates without the dicalcium ferrites or iron oxide present as such.

In evaluating the weathering characteristics of the agglomerates, tests were made in which the amounts of fume remained relatively constant but the amounts of CaO and MgO in the charged flux material were varied to obtain a varied CaO/MgO ratio in the fired agglomerates. The charge mixes were agglomerated in a rotary kiln and produced agglomerates having the following analyses:

ANALYSES OF FIRED AGGLOMERATES

| Mix | Percent | | | | | | | | CaO/MgO |
|---|---|---|---|---|---|---|---|---|---|
| | $Fe_2O_3$ | CaO | MgO | $SiO_2$ | $Al_2O_3$ | Zn | Pb | S | |
| 1 | 23.5 | 70.5 | 1.5 | 2.8 | 3.2 | 0.29 | 0.01 | 0.003 | 47:1 |
| 2 | 22.5 | 67.4 | 4.0 | 2.4 | 3.5 | 0.68 | 0.01 | 0.003 | 16.9:1 |
| 3 | 20.8 | 63.6 | 6.8 | 3.1 | 5.0 | 0.68 | 0.01 | 0.003 | 9.5:1 |
| 4 | 20.2 | 55.6 | 14.8 | 3.4 | 5.3 | 0.48 | 0.01 | 0.003 | 3.75:1 |
| 5 | 21.2 | 52.1 | 19.9 | 2.8 | 3.6 | 0.49 | 0.01 | 0.004 | 2.6:1 |

Agglomerates made from each mix were placed in water to determine how long a time it required them to hydrate and/or dissolve into dust. Other agglomerates from the mixes were exposed to the atmosphere outdoors in uncovered and covered pans. Agglomerates from mix 1 dissolved in 1 day in water and from mix 2 in 2 days. Agglomerates from mix 3 dissolved in 4 days while the agglomerates from mixes 4 and 5 dissolved in 7 and 8 days respectively.

Agglomerates from mix 1 in the covered pan dissolved after 17 days while they dissolved in 3 days in the uncovered pan. Agglomerates from the other 4 mixes showed no failures in the protected pans after 30 days exposure but some dusting was observed in mix 2. Agglomerates from mix 2 began to crack after 30 days in the uncovered pan whereas the other mixes held up after 30 days.

It is obvious that the weather resistance of the agglomerates increases when the charged flux material contains magnesia (MgO) in an amount sufficient to form a line to magnesia (CaO to MgO) ratio in the range of from 2.5:1 to about 15:1 in the finished agglomerate. To obtain the required CaO to MgO ratio it is necessary to charge at least 5% but not more than 20% magnesia based on the total charge made to the kiln.

It will be noted that the addition of a small percentage of MgO, about 4.0%, as dolomitic lime to the mix had an effect in increasing the stability of the agglomerate. Additions of more than 20% magnesia lower the melting point of the mix in the rotary kiln to a temperature below 2600° F. resulting in molten material in the kiln rather than a usable agglomerate. It is, therefore, preferred that the amount of MgO added to the mix be about 5% to about 20% to thereby obtain a CaO/MgO ratio in the finished agglomerate of from about 15:1 to about 2.5:1.

It is preferred to use a dolomitic lime type flux having up to 70% $CaCO_3$, 25% $MgCO_3$, 4.0% $SiO_2$, 0.75% $Al_2O_3$, the remainder incidental impurities, as a part of the charge to the rotary kiln. The flux remaining in the agglomerates makes it possible to charge the agglomerates into metallurgical furnaces with accompanying flux additions such as calcined lime or limestone in lesser amounts than ordinarily used.

In a specific example of the invention a mix containing by weight 14.3% carbon, 12.6% $Fe_2O_3$, 0.12% sulfur, 0.24% zinc, 0.05% lead, 5.9% $SiO_2$, 0.58% $Al_2O_3$, 27.9% CaO, 8.8% MgO, balance substantially all $CO_2$ was charged into one end of a rotary kiln. To reduce the zinc oxide and lead oxide there was added coke breeze having a particular size of all minus 20 mesh Tyler sieve in the ratio of 8 lbs. of coke breeze per 100 lbs. of feed mix. The kiln was fired with natural gas and air within a temperature range of 2200° F. to 2610° F. As the temperature of the kiln approached 2560° F., agglomeration began. At 2610° F., the mix became semi-plastic. The natural gas had a heating value of 1020 B.t.u. per cubic foot and the following chemical analysis expressed in volume percent: 0.98% $CO_2$, 0.38% $N_2$, 93.28% $CH_4$, 3.98% $C_2H_6$, 0.96% $C_3H_8$, and 0.42% higher hydrocarbons. The resultant agglomerates were found to contain lime and magnesia particles in a matrix of dicalcium ferrite, wustite, magnesiowustite, magnesoferrite, magnetite and complex silicates. The analysis of the agglomerates was found to be 21.6% iron oxide, 47.0% CaO, 15.0% MgO, 10.0% $SiO_2$, 3.1% $Al_2O_3$, with 0.018% sulfur, 0.04% zinc, and less than 0.01% lead and other impurities such as $TiO_2$ and manganese (the lead determination being within the limit of the accuracy of the analytical method used). The iron content remains constant, that is, there is substantially no loss of iron during agglomeration. However, there is a loss in the charge mix due to the removal of zinc, lead and sulfur and due to the calcination of the flux in the charge. Therefore, based on the ratio of iron in the charge to the iron in the resultant product, the agglomerating procedure resulted in a removal of 90% of the charged zinc, 91% of the sulfur and substantially 99% of the lead. The CaO/MgO ratio was 3.1 to 1.

The agglomerates were tumble tested with an 80%+¼" index (2 pound tumble) and were found to be satisfactory. In order to determine resistance to moisture or weathering, samples of the agglomerates were immersed in water until they decomposed to form a sludge, which time was one week. A portion of the agglomerates were allowed to be exposed to the atmosphere. No appreciable dusting nor any dissolution of the agglomerates was observed after four weeks exposure.

It should be understood in this specification that, wherever percentages are referred to, such percentages are by weight except for the natural gas analysis.

We claim:

1. A method of preparing agglomerates suitable for use as charge materials for metallurgical furnaces from iron-oxide-containing fume produced in oxygen refining processes which fume contains zinc oxide and/or lead oxide and sulfur as contaminants comprising, forming a mix of at least 10% by weight of the fume and the balance flux materials containing lime and magnesia, the magnesia being present in amounts not more than 20% by weight of the mix and in weight ratio of 2.5–15.0 lime to 1.0 magnesia, charging the mix into one end of a rotary kiln, adding thereto a carbonaceous material in an amount sufficient to provide reducing conditions for only the zinc oxide and/or lead oxide within the range of about 8% to about 20% by weight of the fume and flux mix, firing the charged materials in the rotary kiln with fuel and excess oxygen within a temperature range of about 2200° F. to about 2700° F. to thereby reduce the zinc oxide and/or lead oxide with said carbonaceous material to metallic zinc and/or lead, the zinc and/or lead and sulfur being removed as oxidized impurities, and to thereby form stabilized agglomerates containing iron oxide, lime and magnesia, the lime and magnesia being present in said weight ratio.

2. A method as claimed in claim 1 in which the magnesia is added in the form of dolomitic lime, the magnesia content of the mixture being from about 5.00% to about 20.0% by weight.

References Cited
UNITED STATES PATENTS

| | | | |
|---|---|---|---|
| 3,374,085 | 3/1968 | Stone | 75—25X |
| 3,403,018 | 9/1968 | Thom | 75—25 |
| 2,844,457 | 7/1958 | Amberg | 75—3 |
| 3,163,519 | 12/1964 | Hanson | 75—3 |
| 3,235,371 | 2/1966 | Volin | 75—3 |

L. DEWAYNE RUTLEDGE, Primary Examiner

J. E. LEGRU, Assistant Examiner

U.S. Cl. X.R.

75—3